(No Model.)

G. W. DOW.
SHIPPING BOX FOR BURIAL CASES.

No. 259,981. Patented June 20, 1882.

Witnesses
W. C. Corlies
L. A. Bunting

Inventor
Gardner W Dow
By Coburn & Thacher
Attorneys

UNITED STATES PATENT OFFICE.

GARDNER W. DOW, OF MARSEILLES, ILLINOIS, ASSIGNOR OF ONE-HALF TO JAMES MONTGOMERY, OF SAME PLACE.

SHIPPING-BOX FOR BURIAL-CASES.

SPECIFICATION forming part of Letters Patent No. 259,981, dated June 20, 1882.

Application filed August 28, 1880. (No model.)

*To all whom it may concern:*

Be it known that I, GARDNER W. DOW, of Marseilles, in the county of La Salle, in the State of Illinois, have invented certain new and useful Improvements in Shipping - Boxes for Burial-Cases, which are fully set forth in the following specification, reference being had to the accompanying drawings, in which—

Figure 1:
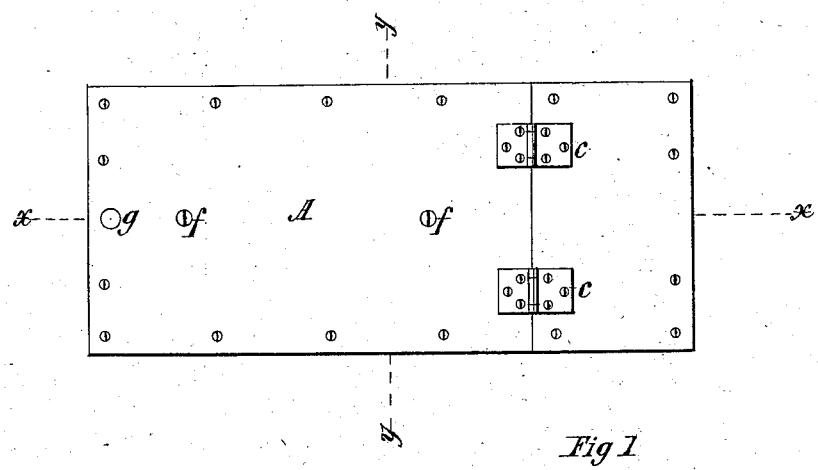
Figure 2:
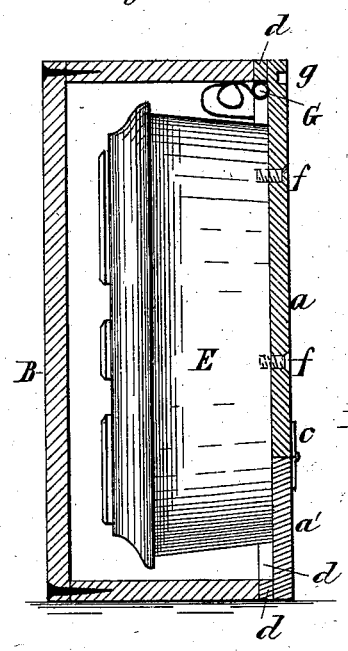
Figure 3:
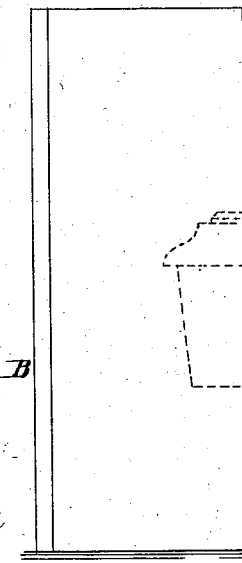
Figure 4:
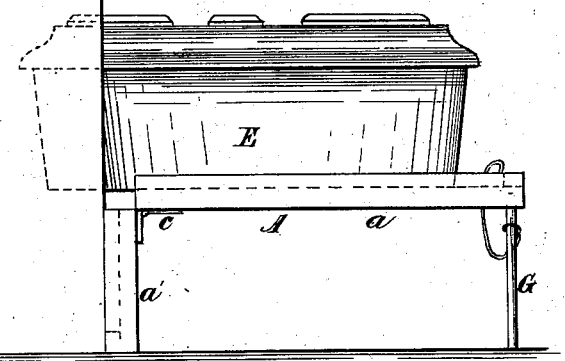
Figure 4:
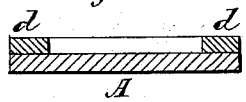

Figure 1 is a plan view of the bottom of my improved box. Fig. 2 is a longitudinal section of the same on the line $xx$ in Fig. 1, the burial-case being shown in position in the box. Fig. 3 is a side elevation, showing the box opened for the exhibition of the burial-case, which is represented in position as in Fig. 2. Fig. 4 is a transverse section of the bottom of the box, taken on the line $y y$ in Fig. 1.

The same letters denote the same parts in all the figures.

My invention relates to boxes for the protection of burial-cases in transportation, storage, and interment, and to the arrangement of burial-cases in such boxes; and it consists in a box for such purposes provided with a bottom in hinged sections, of the proportion hereinafter described, and in a burial-case arranged therein in the manner hereinafter described, the object being to make the same box serve for transportation, storage, exhibition, and interment, and to make the weight of the burial-case available for closing the box and keeping it closed when the box is set on end.

In the drawings, A denotes the bottom, and B the cover, of a shipping-box. The bottom is transversely divided, so as to consist of a longer section, $a$, and a shorter section, $a'$, connected by the hinges $c$. The strengthening-cleats $d$ on the inner face of the bottom are placed on the margins, as shown in Fig. 4 of the drawings, so as not to diminish the depth of the interior of the box. The longer section, $a$, of the bottom is made long enough to give a firm support to the burial-case E, which rests on the bottom of the box within the strengthening-cleats, and is affixed to the longer section, $a$, by screws $f$, passing through $a$ and entering a short distance into the bottom of the burial-case. The burial-case is not fastened to the shorter section, $a'$, but the two sections are so proportioned that about one-fourth of the length of the burial-case rests against this section when the box is closed.

The bottom and cover are fastened on the rest of the box in any usual way, regard being had to the fact that it will not be necessary to remove the cover, while the bottom should be made so that it can be detached without being marred.

For the purpose of exhibition in the undertaker's wareroom the box containing the burial-case is set on the end nearest the short section, $a'$. The fastenings which hold the longer section, $a$, to the side pieces and upper end piece are then undone, and this section is let down to a horizontal position, the section $a'$ still remaining affixed to the rest of the box.

A prop, G, of suitable length, may be conveniently attached by a cord to the inner side of $a$, near its outer end, so as to be transported in the box, as shown in Fig. 2 of the drawings, and readily set under the outer end of $a$ when that is let down.

A socket, $g$, adapted to receive the upper end of the prop, may be sunk in the outer surface of $a$, as shown in the drawings. When the burial-case has been shown sufficiently the box can be closed again by lifting the section $a$ into its place against the side and end pieces, and this process of opening and closing can be repeated as often as may be desired without once touching the burial - case or shifting it from its position on the bottom of the box. The weight of that part of the burial-case which extends beyond the lower end of the section $a$ makes it very easy to close the box, and is also sufficient to keep it closed, so that there is no need of replacing the fastenings until the box has to be removed. At the same time the weight of that part which rests on the section $a$ when the box is open is amply sufficient to support the whole burial-case, so that there is no danger of straining it. When, however, it becomes necessary to unbox the burial-case, it can readily be done by loosening the screws which attach it to the section $a$.

When at the grave it becomes necessary to inclose the burial - case in an outer box the same box may advantageously be used, the bottom being first entirely detached and the cover B being used as the bottom, the burial-case being set on the inner face of B. The short section, a', being folded back on a, the latter is then set in its place on the side and end pieces and fastened there. The shorter section, a', is then turned to its place and also fastened down, the whole process being expeditiously and smoothly effected at a time when delays and interruptions are specially undesirable.

If desired, the fastening may be done after the coffin has been lowered into the grave, the undertaker standing on the edge of the box while putting the longer section, a, in place, and then stepping on that to finish the work.

Having thus described my invention, what I claim as new, and desire to secure by Letters Patent, is—

1. A shipping-box for burial-cases provided with the bottom A, consisting of the hinged sections a and a', in combination with means for detachably affixing the burial-case to the section a, substantially as and for the purposes described.

2. A shipping-box provided with a bottom in two sections, one hinged upon the other, in combination with a burial-case arranged therein so that about one-fourth of its length shall be opposite the fixed section and detachably fastened to the swinging section, for the purpose of using the weight of the burial-case to facilitate the closing of the box and to keep it closed when the box is set on end, substantially as described.

GARDNER W. DOW.

Witnesses:
C. W. POMEROY,
PERCY E. CHAPPLE.